United States Patent [19]
Learmonth et al.

[11] Patent Number: 6,075,706
[45] Date of Patent: Jun. 13, 2000

[54] PC CARD FOR RECEIVING CHIP CARD

[75] Inventors: Iian Thomas Learmonth, North Waltham, United Kingdom; Jan Zeyfang, Leutenbach, Germany; Martin Gollhofer, Fellbach, Germany; Tobias Schimmele-Brell, Weinstadt-Grobhepp, Germany; Andreas Schremmer, Schorndorf, Germany

[73] Assignee: ITT Manufacturing Enterprises, Inc.

[21] Appl. No.: 09/287,946

[22] Filed: Apr. 7, 1999

[30] Foreign Application Priority Data

Apr. 7, 1998 [DE] Germany ............. 198 15 549
Oct. 8, 1998 [DE] Germany ............. 198 46 366

[51] Int. Cl.$^7$ ................ H05K 5/00; H01R 25/00
[52] U.S. Cl. ............... 361/737; 361/741; 361/756; 361/683; 361/753; 361/733; 235/441
[58] Field of Search ................... 361/737, 741, 361/756, 683–685, 733, 754, 736, 750, 753; 235/441, 487, 492

[56] References Cited

U.S. PATENT DOCUMENTS 5,408,384  4/1995  Gannyo et al. .................. 361/737
5,752,857  5/1998  Knights ........................... 439/638
5,955,722  9/1999  Kurz et al. ...................... 235/479

*Primary Examiner*—Leo P. Picard
*Assistant Examiner*—Hung Van Duong
*Attorney, Agent, or Firm*—Thomas L. Peterson

[57] ABSTRACT

A PC card (10) of standard width and thickness (e.g. 54 mm and 5 mm) is constructed to receive a chip card (20) of smaller width and thickness (e.g. 18 mm and 0.8 mm) so the PC card can be used to connect contact pads (60) of the chip card to an electronic device such as a laptop computer into which the PC card is inserted. A frame (22) is mounted in a fixed position on a circuit board of the PC card, the frame having a recess (82) substantially the same width as that of the chip card for closely receiving the chip card to locate it so pads on the chip card engage chip contacts (76) that are also mounted on the circuit board. A planar top portion (86) of a sheet metal cover part has an aperture (24) that communicates with the recess in the frame to permit the insertion of the chip card through the aperture and into the recess of the frame. A sheet metal lid (26) is slidably mounted directly under the top sheet metal cover portion between an open position to pass the chip card and a closed position to close the aperture so radio waves cannot pass therethrough.

20 Claims, 9 Drawing Sheets

PC CARD FOR RECEIVING CHIP CARD

BACKGROUND OF THE INVENTION

PC cards are usually constructed in accordance with standards of PCMCIA (Personal Computer Memory Card Industry Association) which specifies a card width of 54 mm and a card maximum thickness of 5 mm for the most popular type which is a Type II (Type I has a thickness of 3.3 mm while Type III has a thickness of 10.5 mm). It is noted that the standards can change somewhat. Such cards are designed to be inserted into slots of electronic devices where connectors of the card and electronic device can mate. It is sometimes useful to provide a PC card that serves as an adaptor for a much smaller card such as a SIM card which has a width about ⅓ that of the PC card (a width of about 18 mm, length of about 28 mm, and thickness of 0.8 mm). Such small cards, which can be referred to as chip cards, are commonly used as credit or authorization cards as to authorize mobile telephone use. The much smaller and more rugged chip cards are of widespread use, and the adaptor enables them to be read and written into by an electronic device such as a laptop computer that can only receive a PC card. A PC card which could receive a much smaller chip card, where the PC card was of simple and rugged design, would be of value.

SUMMARY OF THE INVENTION

In accordance with one embodiment of the present invention, a PC card is provided which is adapted to receive a chip card of much smaller width, thickness, and length than the PC card, which is of simple and effective construction. A frame is mounted at a fixed horizontal position on a circuit board within the PC card, the frame having a recess of substantially the same width as that of the chip card to be received to position the chip card. Contacts that are terminated to traces on the circuit board have pad-engaging ends lying within the recess. A planar top portion of a sheet metal cover has an aperture leading to the recess, so a chip card can be inserted through the aperture and into the recess to allow the contacts to engage pads on the chip card.

A sheet metal lid lying in a plane parallel to that of the top sheet metal cover portion, can slide between a closed position wherein it closes the aperture to prevent the passage of radio waves therethrough, and an open position to allow the chip card to pass into the recess of the frame. The sheet metal lid can has tabs on opposite sides which are bent to engage guides that guide the lid in sliding movement. In one PC card, the lid is slideable on guides formed in the frame, so the position of the lid with respect to the frame is closely controlled. In another PC card, the lid is slidably mounted directly on the top sheet metal cover portion at opposite side edges of the aperture. In another PC card, the chip card is held down in the frame recess to keep its pads pressed against the contacts, by an aperture in the sheet metal cover which is not as long as the length of the chip card. In another PC card, the aperture is a thin slot that allows a chip card to be slid horizontally into the frame.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
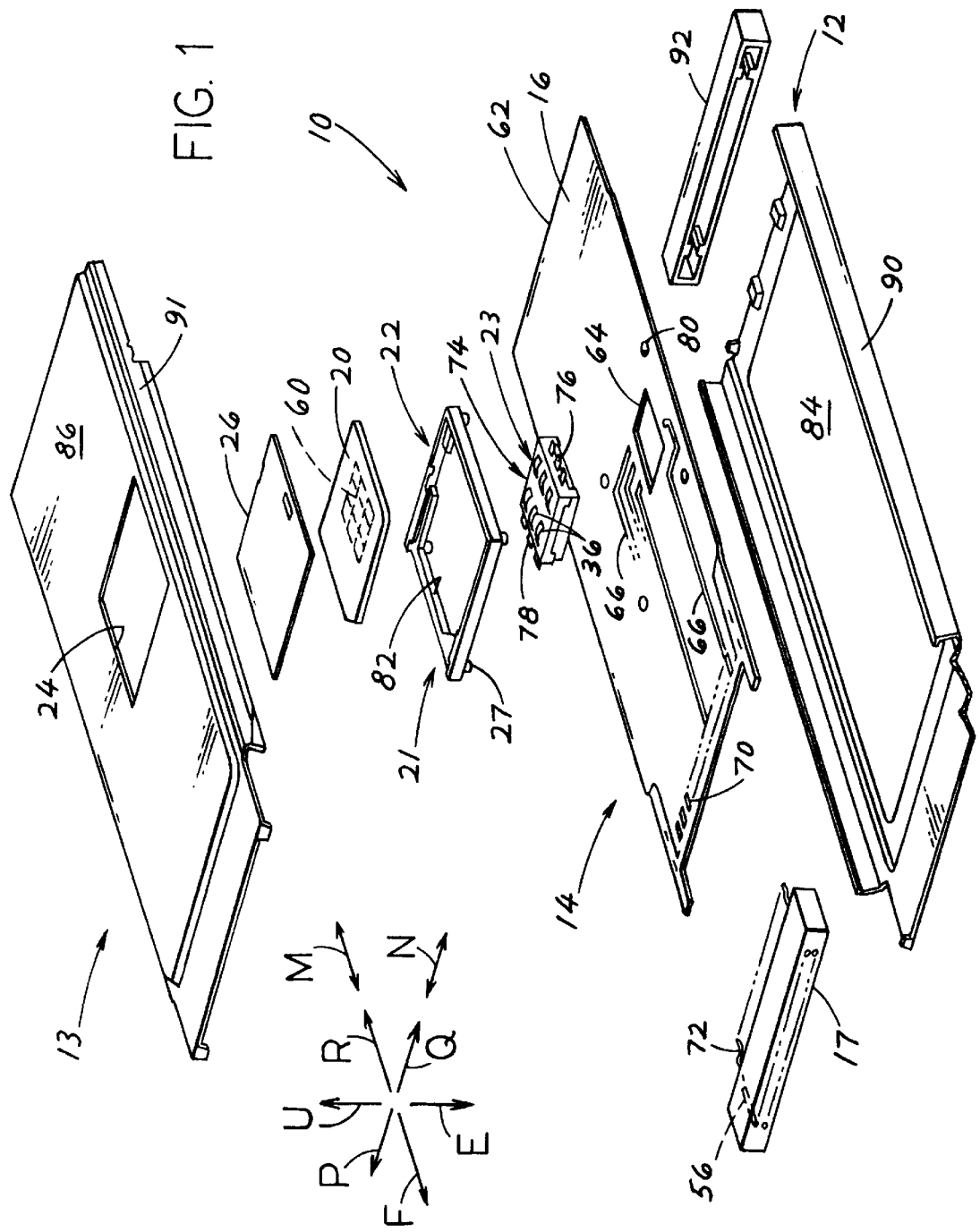
FIG. 1 is an exploded isometric view of a PC card of a first embodiment of the invention, and showing a chip card.
Figure 3:
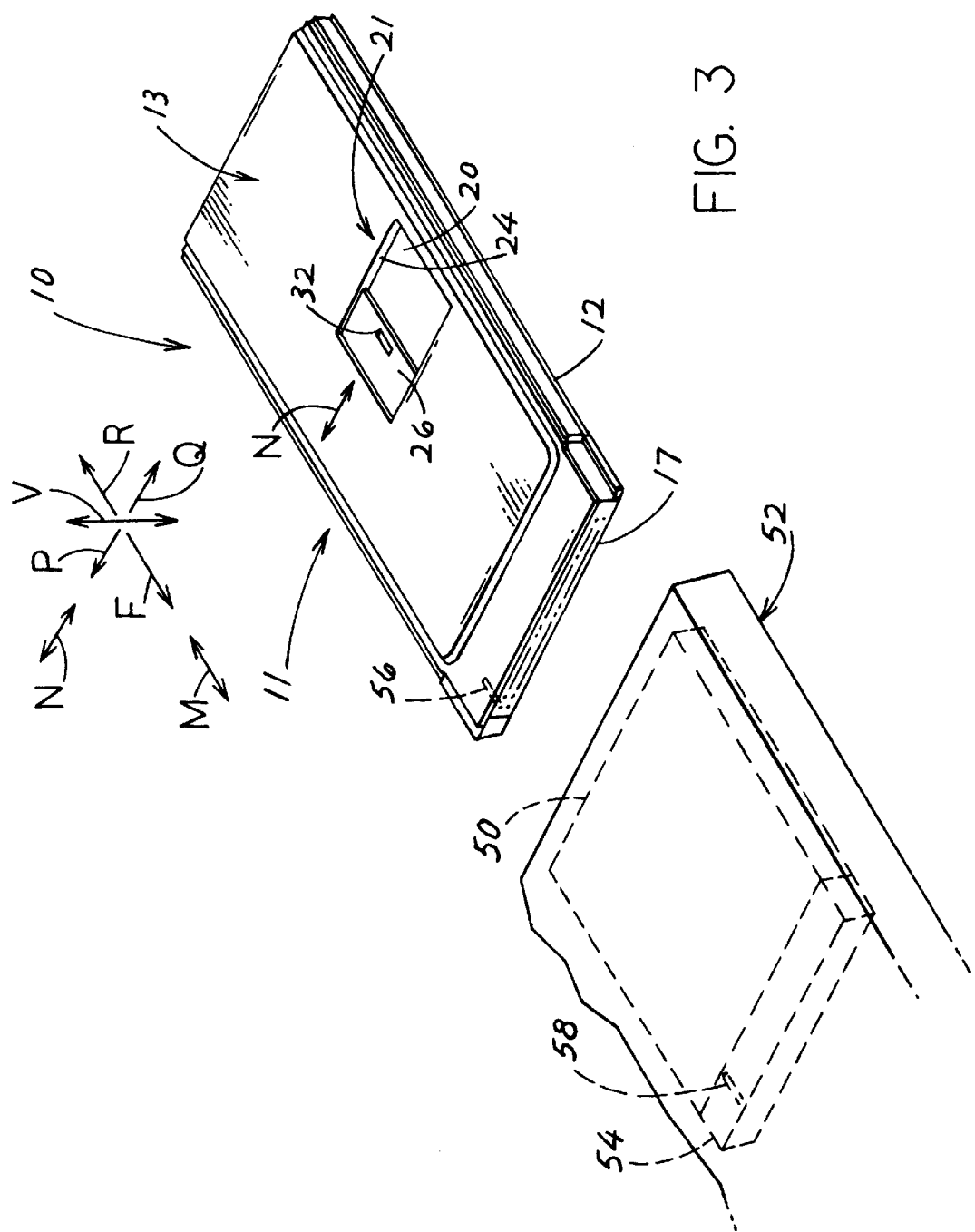
FIG. 3 is a front isometric view of the assembled PC card of FIG. 1, with the lid partially open, and showing a portion of an electronic device with a slot that can receive the front portion of the PC card.

FIG. 3 illustrates a PC card 10 which is a Type II card under PCMCIA standards, with a maximum height in a vertical direction V of 5 mm, and a width in lateral directions N of 54 mm. The length of the PC card in a longitudinal direction M is commonly 85 mm, but can vary. The PC card is designed to be inserted into a card slot 50 of an electronic device 52 such as a laptop computer, until a front connector 17 of the PC card mates with a device connector 54 at the front end of the card slot 50. Such mating results in contacts 56, 58 of the PC card front connector and of the device connector engaging each other to allow currents to flow between them. As shown in FIG. 1, the PC card 10 is designed to be used as an adaptor that can receive a chip card 20. The chip card has a width in a longitudinal direction M of about 28 mm and a length in a lateral direction N of about 18 mm, which are both about one-third that of the PC card. The chip card has a thickness of 0.8 mm. When the chip card 20 is installed in the PC card, contact pads 60 on a lower face of the chip card are connected to the front connector contacts 56, so information can be read out and read into the chip card by the electronic device which receives the PC card.

The PC card includes a circuit board assembly 16 which has a board 62 with a location 64 where chip card-engaging contacts are to be located. The board has traces 66 (that may lie on the board lower face) extending from location 64 to a row of trace pads 70 at a front of the circuit board. The contacts 56 of the front connector 17 have tails 72 that are soldered to the trace pads 70. A contact block 23 is designed to fit at the location 64 on the circuit board. The contact block includes a molded plastic housing 74 and a series of chip contacts, or block contacts 76 with termination ends 78 that are soldered to the traces 66, and with pad-engaging ends 36 at the top of the block housing.

When the chip card 20 is pressed down against the contact block, the contact pads 60 on the chip card engage the pad-engaging ends 36 of the chip-engaging contacts or chip contacts, to thereby make connection through the traces 36 to the front connector contacts 56. It is noted that it is possible to use components along the traces 66, such as diodes to discharge high current pulses or capacitors to serve as filters, although direct connections are usually preferred through the use of simple traces for the connections.

Figure 2:
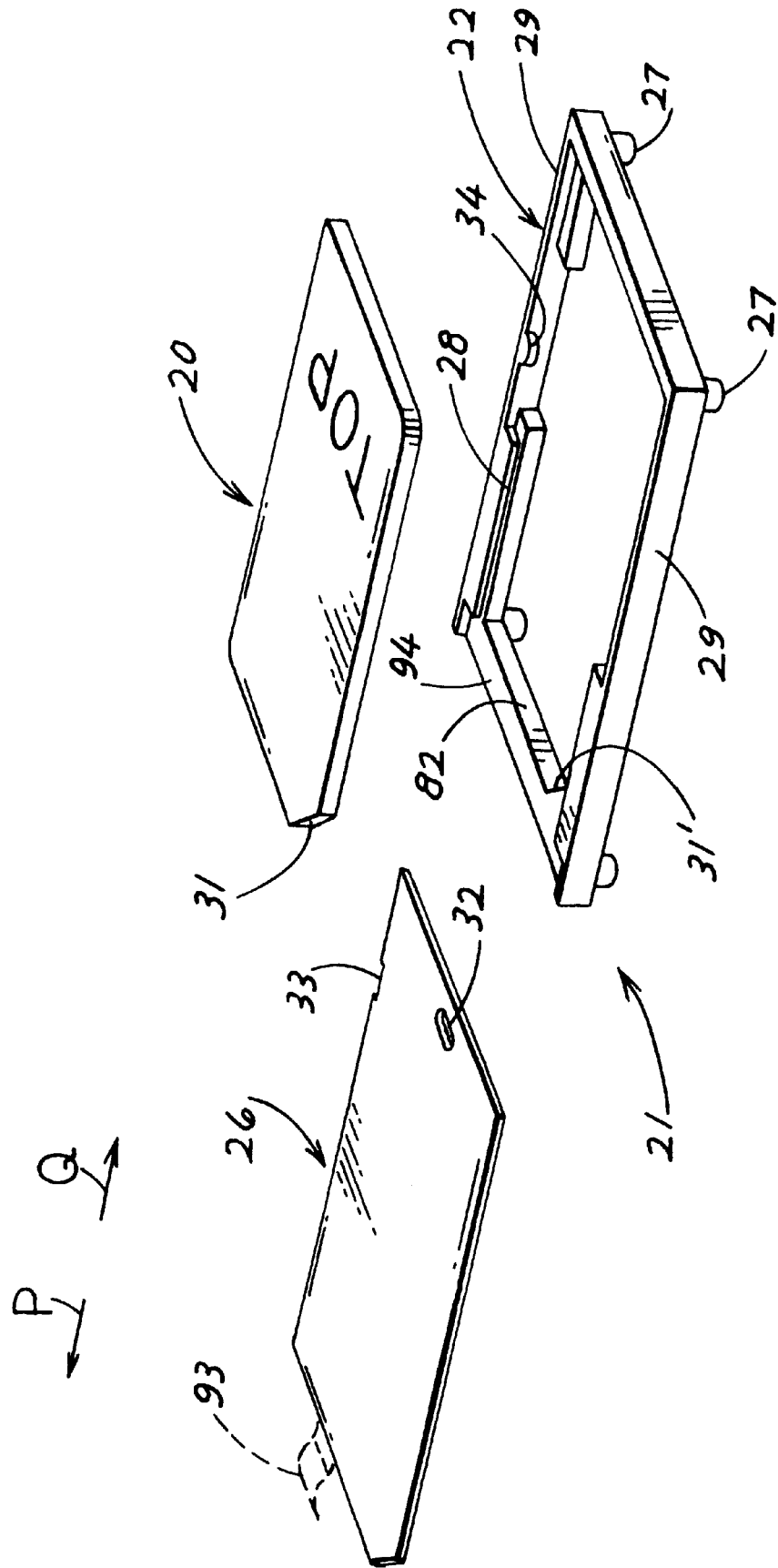
FIG. 2 is an exploded isometric view of only the frame, lid, and chip card of FIG. 1.

A frame 22 closely locates the chip card so its contact pads 60 are directly over the pad-engaging ends 36 of the block contacts. The frame 22 is preferably of molded plastic material, and is mounted at a fixed position on the circuit board 62. This can be accomplished by four pegs 27 on the frame that are received in corresponding holes 80 in the circuit board. As shown in FIG. 2, the frame 22 forms a recess 82 that closely receives the chip card 20, with a key 31 on the chip card lying near a barrier 31' on the frame. FIG. 1 shows that the PC card includes bottom and top sheet metal cover parts 12, 13 that have largely planar bottom and top parts 84, 86 that lie respectively below and above the circuit board 62. The bottom and top sheet metal cover parts 12, 13 have side flanges 90, 91 that engage each other to hold the sheet metal cover parts together and against the front connector 17. A rear end cap 92 can be used to seal the rear end of the PC card and mechanically connect the rear ends of the top and bottom cover parts to the circuit board, although the rear end cap can include an electrical connector.

The planar top part 86 of the top sheet metal cover part 13, has an aperture 24 to permit the chip card to be inserted therethrough to lie in the frame recess 82, and to permit the removal of the chip card. When the chip card lies in the frame 22, a means is required to hold-down the chip card so its contact pads press firmly against the pad-engaging ends 36 of the chip contacts. It is also desirable to close the aperture 24 in the top cover part. A major purpose of the bottom and top sheet metal cover parts is to prevent the passage of radio waves or EMI (electromagnetic interference) into and out of the PC card. If the large aperture 24 is not shielded against EMI, then sufficient stray signals could enter or leave the PC card through that opening to affect operations that occur at higher frequencies. Applicant provides a sheet metal lid 26 to simultaneously hold-down the chip card 20 and to cover the aperture 24.

As shown in FIG. 2, the lid 26 is designed to slide in outward P and inward Q lateral directions within grooves 28 formed at longitudinal opposite sides of the frame 22. The lid is provided with an indentation 32 to allow a pen point, or other small object, to be inserted therein to enable sliding of the lid in the lateral directions P, Q. It is desirable that the lid 26 be kept at the same electrical ground potential as the top sheet metal cover part 13, which can be accomplished by a grounding tab 93 or other means. When the lid is in its closed position, it is retained thereat by a notch 33 in the lid that receives a lug 34 on the frame. It is noted that the frame has long sides 29 that form the opposite sides of the recess, the frame also having short sides 94 that form the short sides of the recess. The width and length of the recess equal that of the chip card (with clearances on the order of magnitude of 0.5 mm).

To insert a chip card, a person opens the lid 26 (FIG. 1) and then moves down the chip card 20 into the recess 82 in the frame 22. The person then closes the lid 26, which assures that the chip card is held down, and which also closes the aperture 24 to the passage of EMI. It is possible to combine the contact block 23 with the frame 22. It is noted that the pad-engaging contact ends 36 are resiliently depressable. This not only helps to assure that all contact ends 36 engage corresponding chip card pads, but also causes the contact ends to push the chip at least partially out of the frame recess 82 when the lid is open to allow the chip card to move up. This aids in grasping the chip card to remove it through the aperture 24 in the top cover part.

Figure 4:
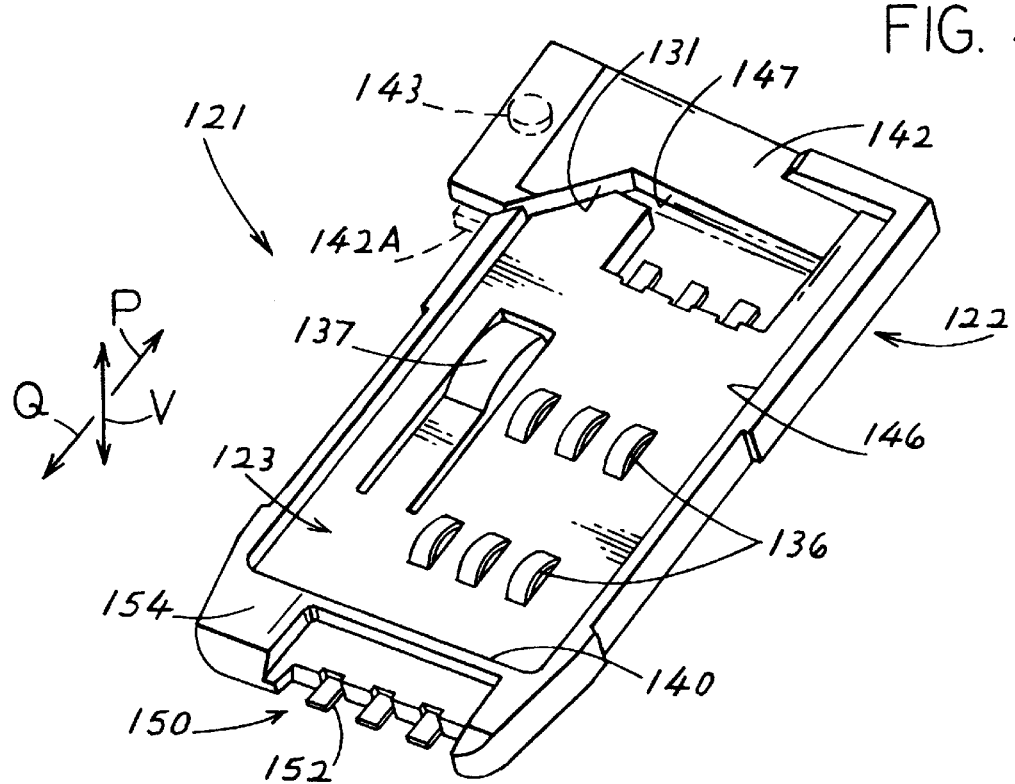
FIG. 4 is a top isometric view of a frame of a PC card constructed in accordance with another embodiment of the invention.
Figure 5:
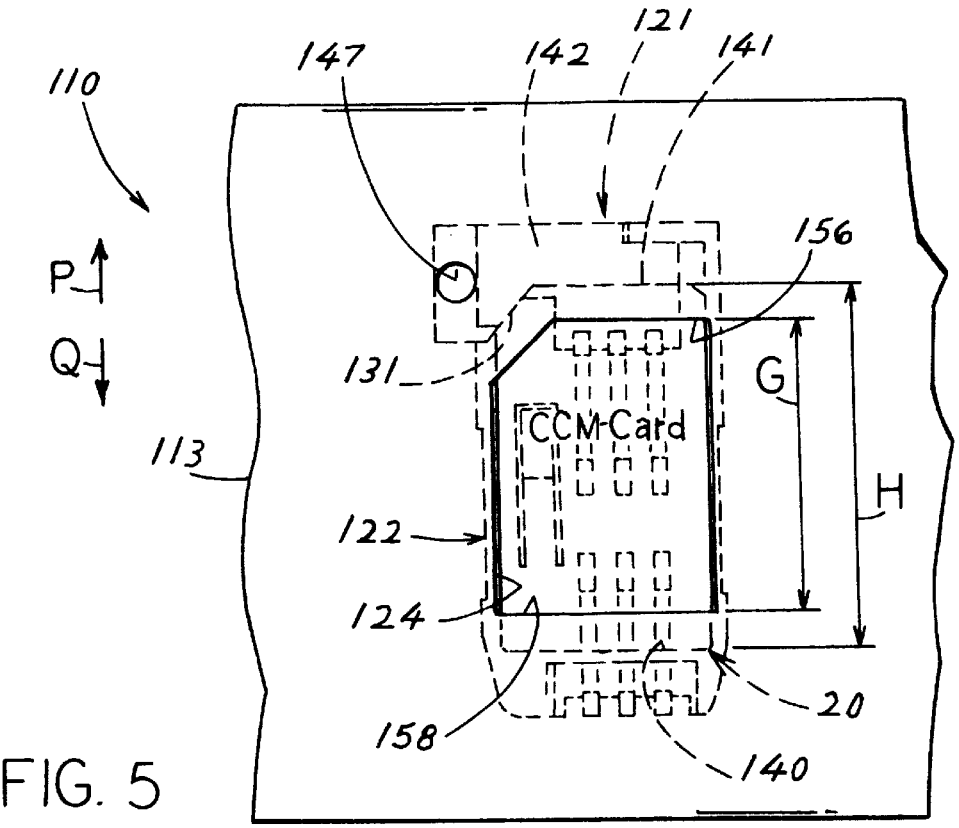
FIG. 5 is a plan view of a portion of a PC card which includes the frame of FIG. 4.

FIGS. 4 and 5 show a PC card 110 with another card-receiving assembly 121 which includes a frame 122 with an integral contacting device or contact block 123 containing chip contacts 150. The contacts have termination ends 152 that can be soldered to circuit board traces and have pad-engaging ends 136 that can engage contact pads of a chip card. The frame has walls forming a recess 146 of the same width as the chip card, the recess having outward and inward walls 142, 154 spaced in the outward and inward directions P, Q. The outward wall 142 lies at a fixed horizontal position on the circuit board, together with the rest of the frame 122. However, the outward wall 142 can be moved vertically V to a downward position 142A. This allows a chip card, during insertion, to be slid outwardly over the outward wall 142 before being slid inwardly Q back to a position wherein the inward end of the chip abuts a recess edge 140 of the inner wall 154. When such inward Q sliding is complete, the outward wall 142 is allowed to move back up to its initial position and forms an outward edge 147 of the recess. In a particular embodiment shown, the outward wall 142 is easily bendable at an end connected to the rest of the frame, to enable it to move down to the position 142A.

FIG. 5 shows a portion of the top cover part 113 of the PC card, which has an opening 124 of a length G which is less than the length H of the chip card 26. To insert the chip card, its outward end 141 is tilted from the horizontal and slipped under the outer end 156 of the aperture 124 in the sheet metal top cover part. Then the chip card 26 is slid inwardly Q again until it lies in its final position in the frame 122, wherein outward and inward ends of the cards are held down by outward and inward ends 156, 158 of the aperture walls. In order to initially insert the card in the outward direction P, a person must depress the frame outer wall 142 which is in the form of a rocker. The frame outer end wall 142 may have a button 143 that lies in a bore 147 in the top cover part 113. The rocker or outer wall 142, with or without a button, can be depressed by inserting a pin through the bore 147. It is noted that with the rocker part 142 of FIG. 4 in its undepressed and upward position, the recess 146 closely surrounds the chip card in the lateral and longitudinal directions, with the edge 147 engaging the outer end of the card.

FIG. 4 shows that the frame 122 is provided with a spring arm 137 that presses the chip card upwardly. The spring arm is useful in helping to remove the chip card (in conjunction with contact ends 136). It is noted that in FIG. 5 the aperture 124 is not closed by a sliding lid. Some EMI protection can be provided by coating the frame 122 with electrically conductive material that is grounded, except at locations adjacent to the contacts 150, or by molding most of the frame of electrically conductive plastic material. It is also possible to provide a sliding lid, where desired.

To remove the chip card in FIG. 4, the rocker 142 is again depressed and the chip card is slid outwardly P until its inward edge can be lifted out through the aperture 124. The spring arm 137 then aids in pushing up the chip card so it can be grasped to be pulled out.

Figure 6:
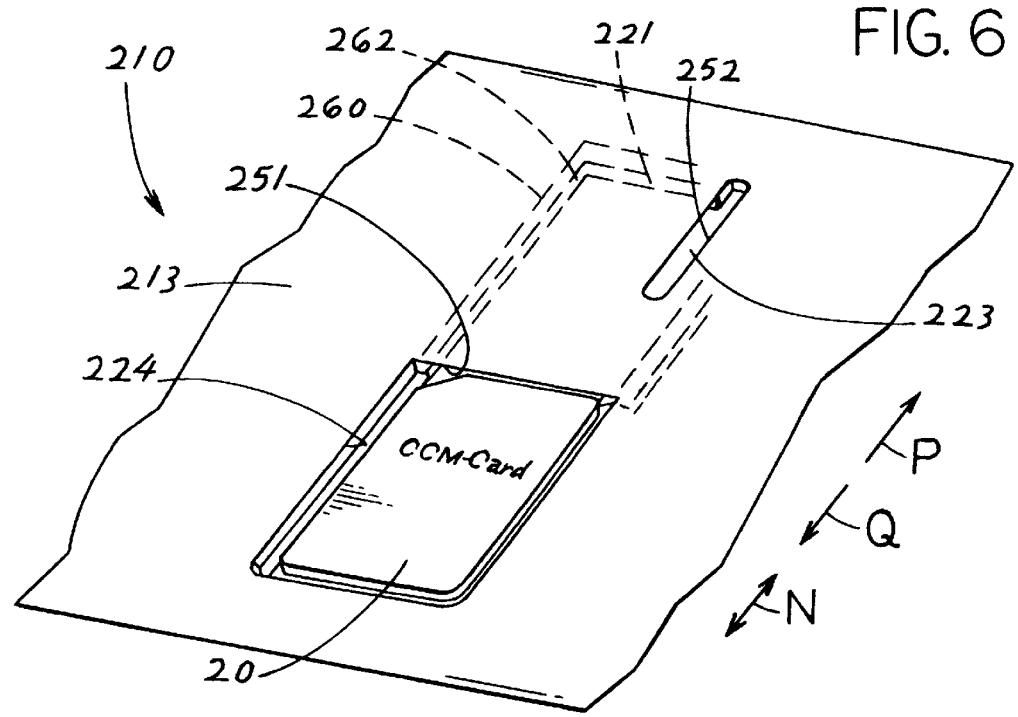
FIG. 6 is an isometric view of a portion of a PC card constructed in accordance with another embodiment of the invention, for receiving a chip card, with the chip card not yet slid to its final position.
Figure 7:
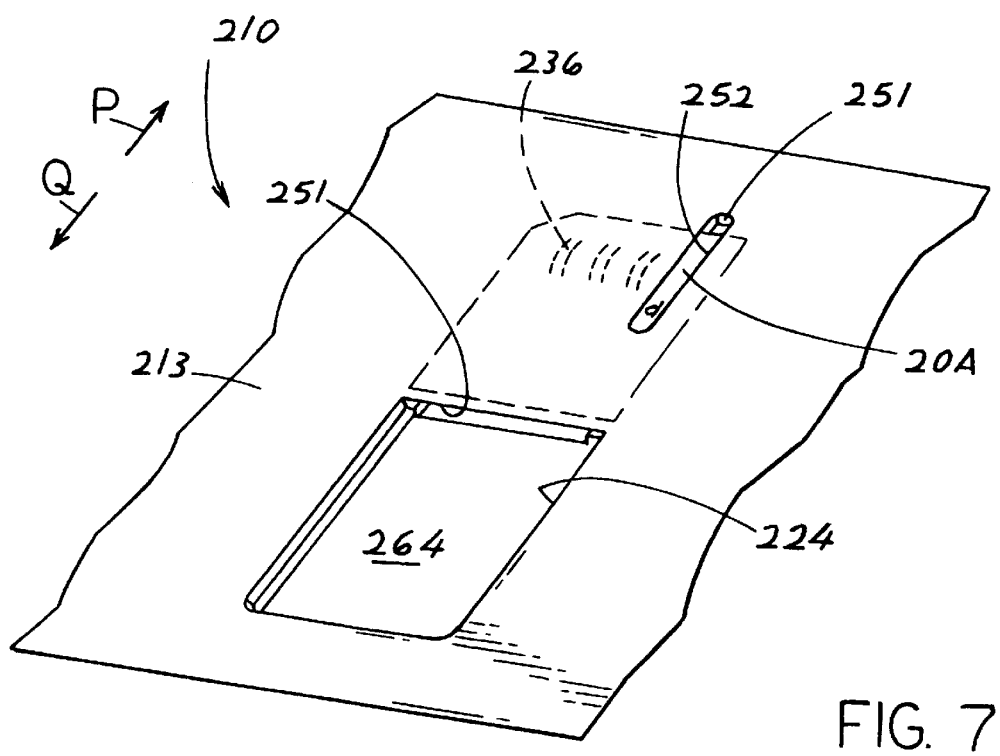
FIG. 7 is a view similar to that of FIG. 6, but with the chip card slid to its final position.

FIGS. 6 and 7 show another embodiment of the invention, wherein the top sheet metal cover part 213 has a depression 224 therein, and with an aperture in the form of a slot 251 at an outward end of the depression. A chip card 20 can be laid in the depression 224 on a depressed sheet metal section 264 of the cover part, and then slid outwardly P into a recess 262 of a frame 260 that lies under the top sheet metal cover part 213 and on a circuit board in the PC card. The chip card is slid outward until it abuts an outward edge 221 of the frame. A contacting device or contact block with pad-engaging contact ends, lies within the frame. The frame and contact block can be of the same construction as shown in FIG. 4, except that the outward end of the frame can be fixed against rocking, and the inward end can be open to allow the chip card 20 to slide outwardly P into the frame recess and engage the pad-engaging ends 236 of the chip contacts. FIG. 7 shows the fully inserted chip card 20A with its pads engaging the contact ends 236. To withdraw the card, a pen tip or other small device is inserted through the far end 251 of an auxiliary slot 252 and the pen or the like is pushed inwardly Q until the chip is moved into the depression 224 and can be removed. The depression 224 actually forms an upwardly-opening recess with a horizontally-opening aperture or slot for receiving the card. The thin auxiliary slot can be closed by a lid to block EMI, if required.

Figure 8:
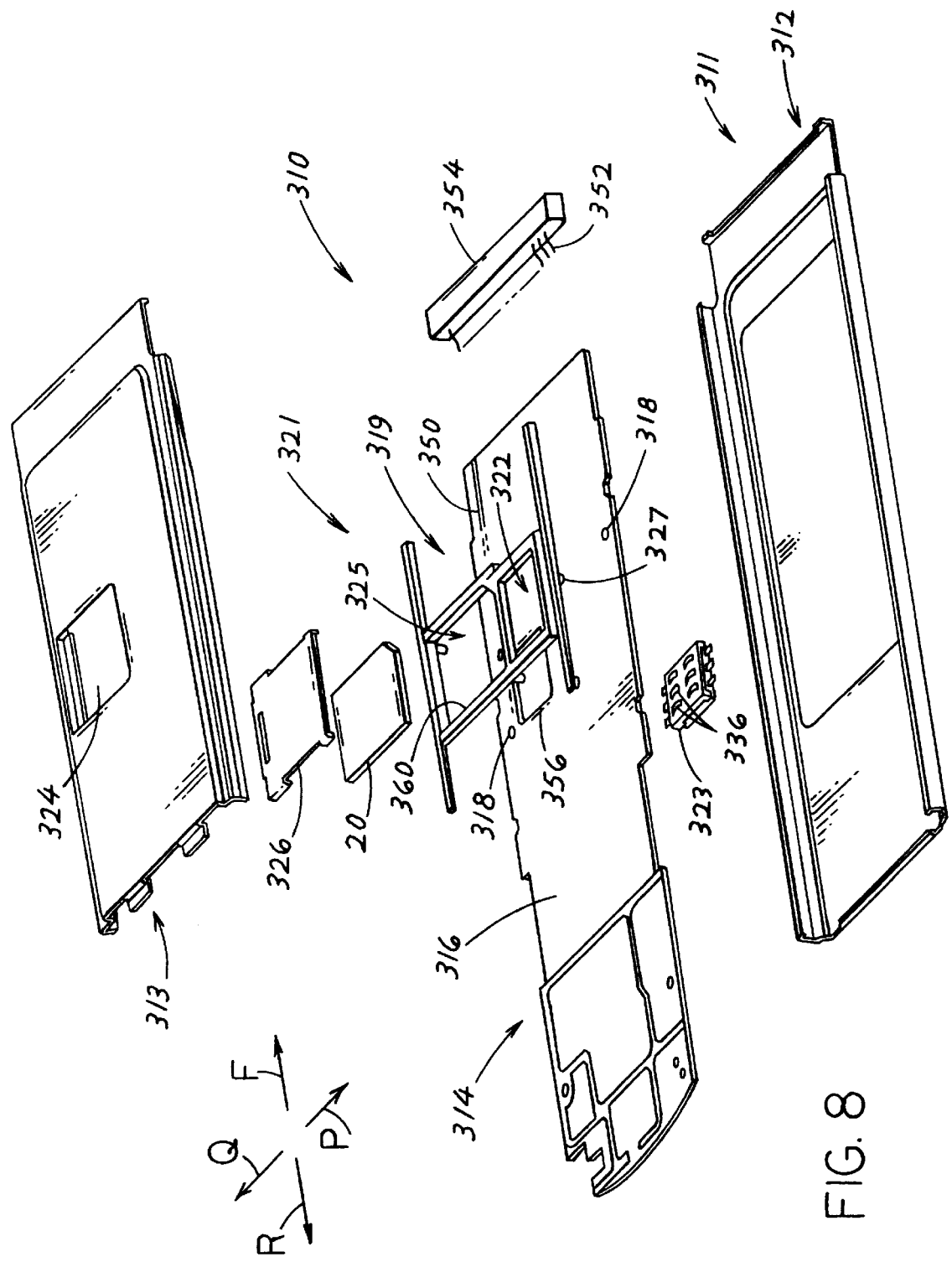
FIG. 8 is an exploded isometric view of a PC card constructed in accordance with another embodiment of the invention, and showing a chip card.
Figure 9:
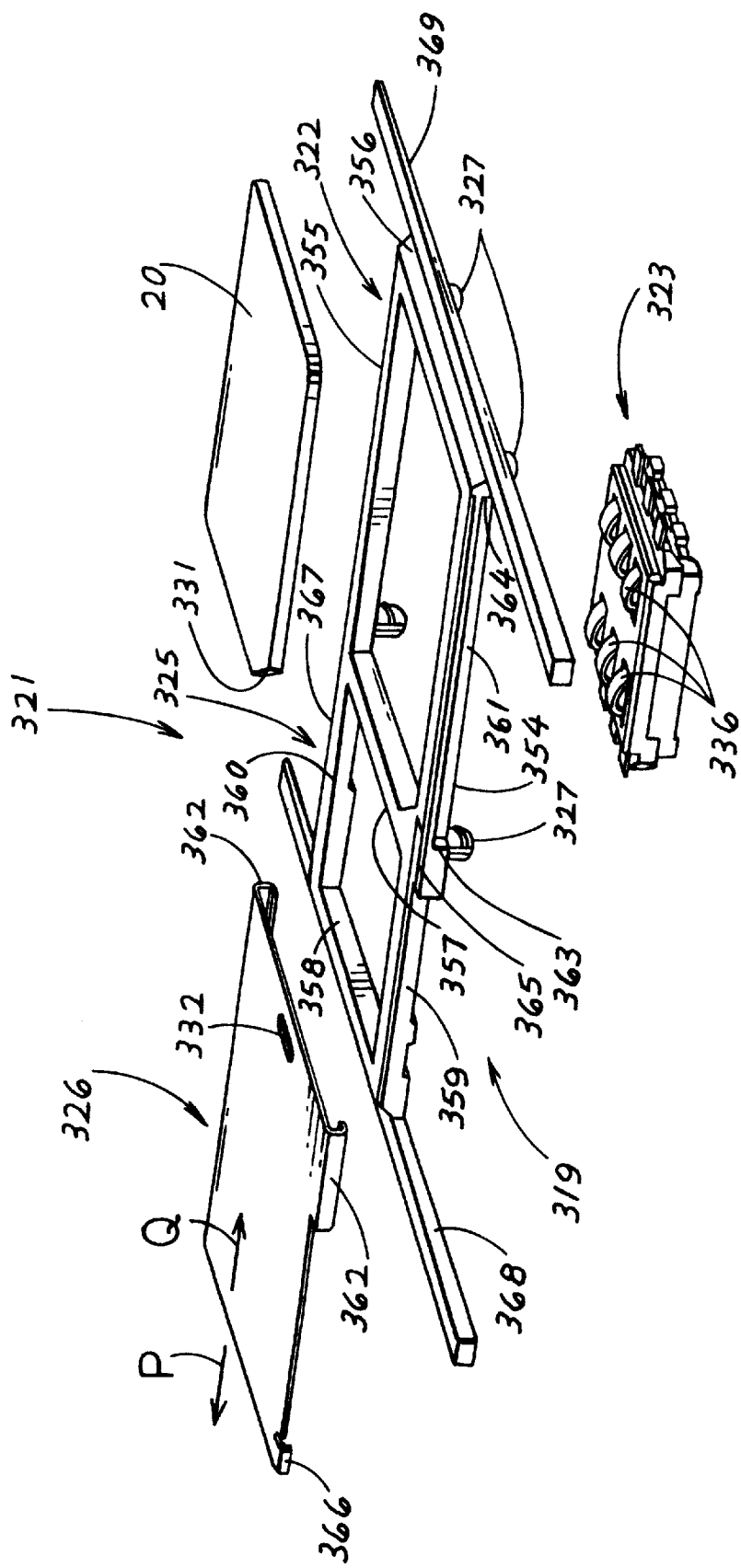
FIG. 9 is an exploded isometric view showing the frame, lid, contact block, and chip card of FIG. 8.
Figure 10:
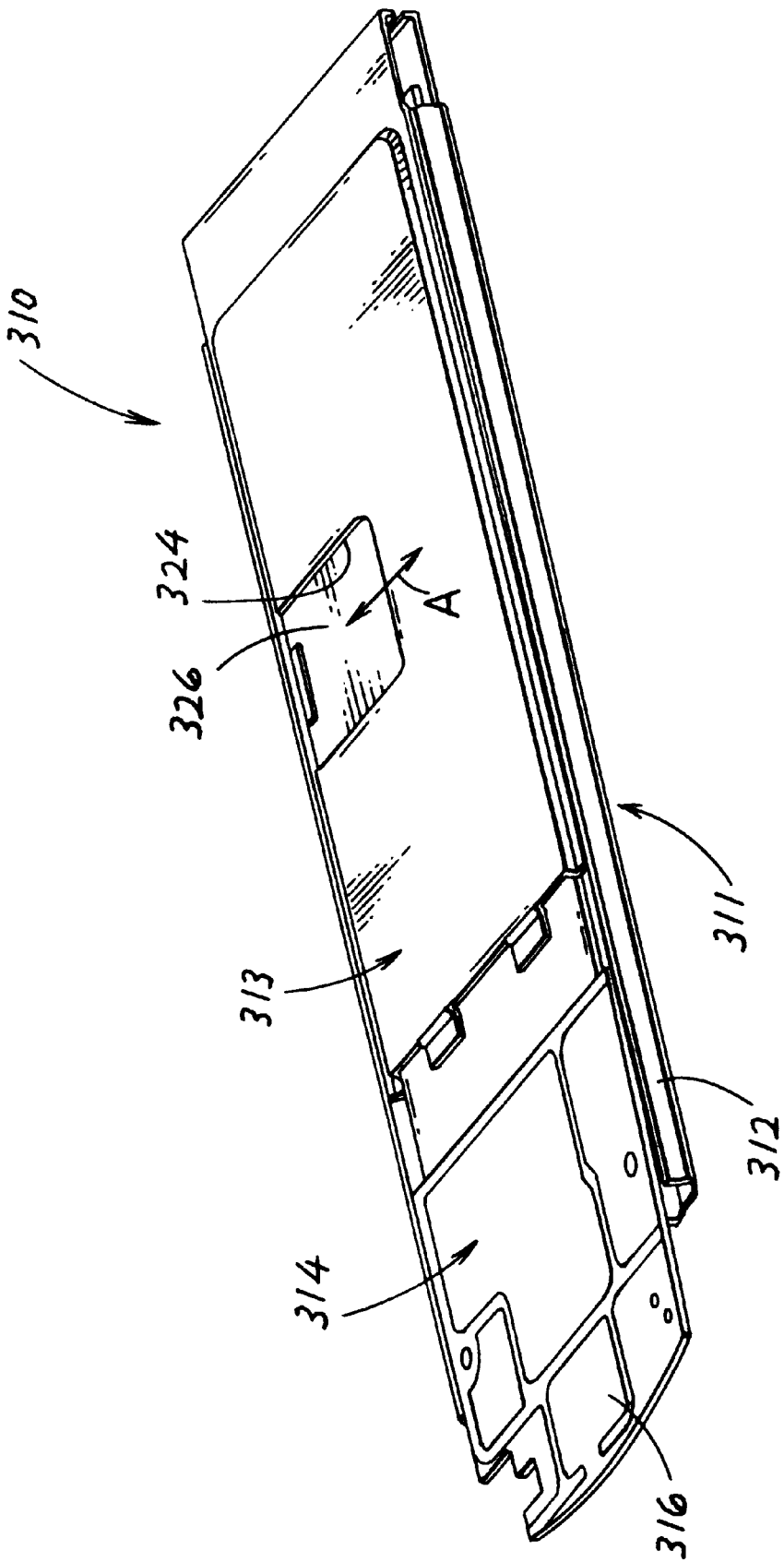
FIG. 10 is an isometric view of the fully assembled PC card of FIG. 8, with the lid closed.

FIGS. 8–10 illustrate another PC card 310 which is somewhat similar to that of FIGS. 1–3. The PC card includes a circuit board 316 with traces 350 thereon that can be connected to the tails 352 of contacts in a front connector 354. A contact device or block 353 is mounted at a location 356 of the circuit board that preferably has a hole to receive it. A frame 319 is also mounted on the circuit board, the frame having a recess 360 of the same width as the chip card 320, and preferably of the same length, to closely position the chip card so pads on its lower surface engage contact ends 336 on the chip contacts. The top sheet metal cover part 313 has an aperture 324 through which the chip card 20 is inserted to be placed in the recess 360 of the frame. A sheet metal lid 326 is slidably mounted on the frame 319 to slide between closed and open positions with respect to the aperture 324. The frame has pegs 327 that are received in holes 318 of the circuit board. As shown in FIG. 9, the sheet metal lid 326 includes guide tabs 362, 366 at its opposite sides. The guide tabs are bent out of the plane of the lid and encircle guides 354, 355, 359, 360 formed on beams of the frame. The frame has orientation struts 368, 369 that maintain the orientation of the frame with respect to the circuit board. The contact block 323 is also mounted on the circuit board. The lid 327 has an indentation 332 to facilitate sliding of the lid. FIG. 10 shows the assembled card, including the circuit board 314 on which the frame is mounted, and with the lid 326 in a closed position.

Figure 12:
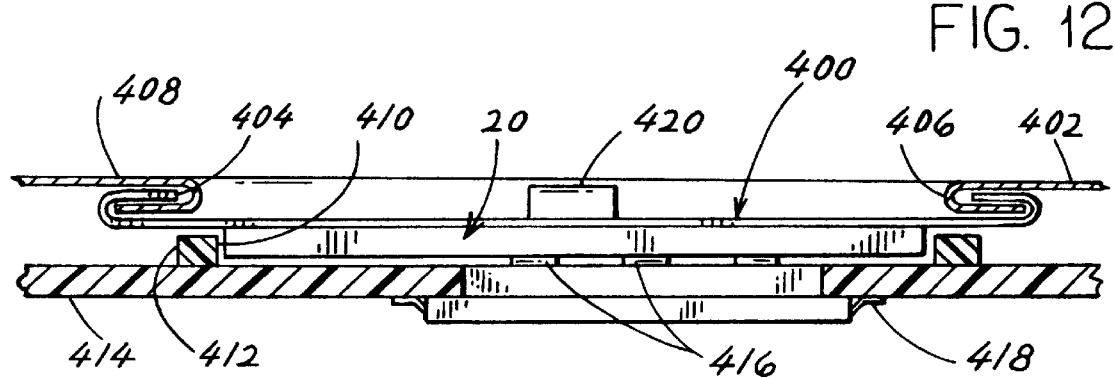
FIG. 12 is a view taken on line 12—12 of FIG. 11, and also showing a chip card lying within the frame that is mounted on the circuit board and held down by the lid.
Figure 11:
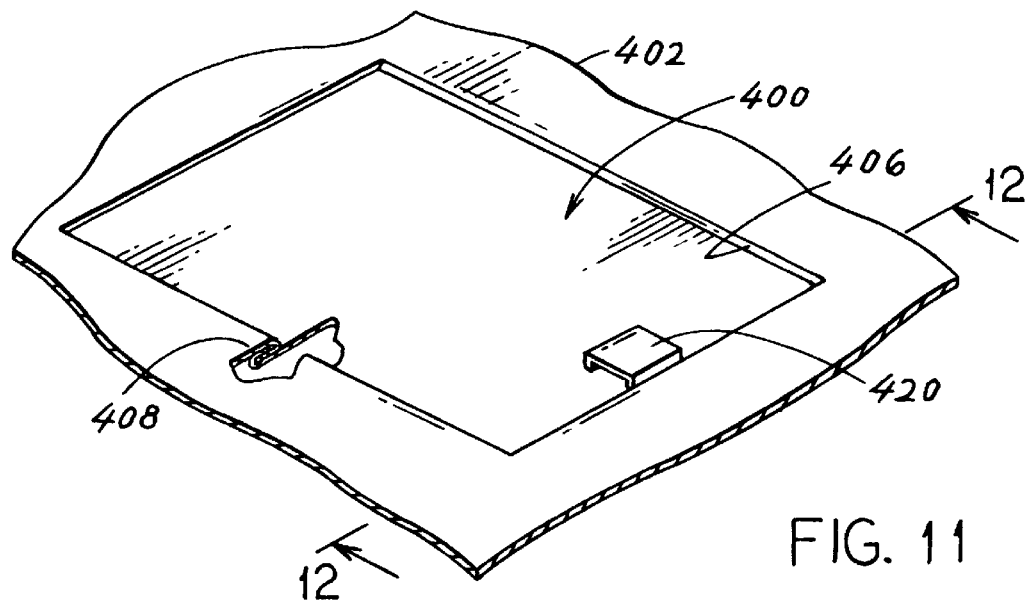
FIG. 11 is a partial isometric view of a PC card with the lid mounted on the top sheet metal cover part.
Figure 13:
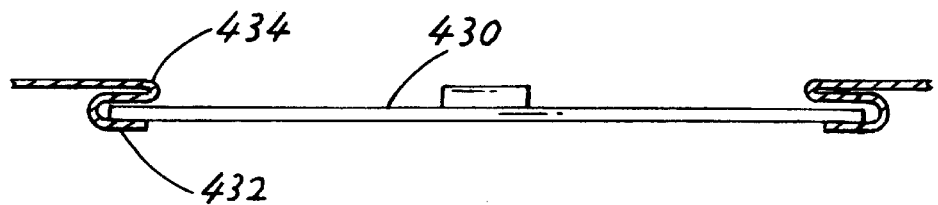
FIG. 13 is a partial sectional view of a lid slidably mounted on a top cover portion, in accordance with another embodiment of the invention.

Although applicant generally prefers to slideably mount a lid on the frame that is fixed in horizontal position on the circuit board, to precisely space the lid from the circuit board, there are some advantages in slidably mounting the lid on the sheet metal top cover portion. FIG. 11 shows a lid 400 mounted on a top sheet metal cover portion 402. FIG. 12 shows the edge portions 408 which form the aperture 406 in the top cover part, to be bent into a U-shape, to receive a corresponding U-shape bent edge part 404 of the lid. The lid holds down a chip card 20 lying closely within a recess 410 of a frame 412 that is mounted on a circuit board 414 of the PC card, against the upward biasing of cardengaging ends 416 of contacts. The contacts have termination ends 418 soldered to traces on the lower face of the circuit board. A handle 420 is formed by bending an end of the lid as illustrated. By mounting the lid directly on the top cover part, applicant can easily maintain electrical contact between the sheet metal lid and the top cover part, in a low cost mounting arrangement, and may obtain an advantage of slight up-down resilience of the top sheet metal cover part in holding down the chip card despite accumulated tolerance although this can be a disadvantage. FIG. 13 shows another arrangement where the lid 430 does not have a bent tab, but lies in grooves formed by bent edges 432 at the opposite sides of the aperture 434.

While terms such as "top", "horizontal", etc. have been used to aid in describing the PC card as illustrated, it should be understood that the PC card can be used in any orientation with respect to the Earth.

Thus, the invention provides a PC card which can receive a chip card of much smaller width, length, and height than the PC card, and connect contact pads of the chip card to contacts of a front connector of the PC card, in a simple and effective arrangement. A top sheet metal cover has a primarily horizontal planar portion with an aperture that leads to a frame that is mounted on the circuit board and that has a recess of the same width as that of the chip card, with chip contacts on the circuit board lying within the recess to engage contact pads on the chip card. In one set of arrangements, the recess is vertically aligned with the aperture so the card can be dropped directly downwardly into the recess, with a sheet metal lid provided to close the recess and hold-down the chip card to the contacts lying within the recess. The lid can be directly slidably mounted on the frame, although it is also possible to slidably mount the lid under the top sheet metal cover part. In another arrangement, the aperture in the top sheet metal cover part is of smaller length than that of the chip card. In that case, the recess in the frame is constructed to allow the chip card to be tilted so its outer end can be slid outwardly into the recess, and then the chip card can be slid inwardly to its final position. In another arrangement, the top sheet metal cover part has a depression into which the chip card can be laid, with a thin slot or aperture at the outer end of the depression into which the chip can be slid to enter the recess in the frame so as to achieve its final position wherein its chip contact pads engage contacts on the circuit board.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A PC card of predetermined lateral width and vertical height for insertion into a card slot of an electronic device to connect a front connector of the PC card to a device connector at the front end of the card slot, where the PC card is constructed to hold a chip card that is of smaller width and height than said PC card, so said PC card can connect contact pads of said chip card through said front connector to said device connector and where said PC card includes a circuit board with circuit board traces, wherein:

said PC card includes a plurality of chip contacts having termination ends terminated to said circuit board traces and having pad-engaging ends;

said PC card has a top sheet metal cover with a primarily planar top portion with an aperture leading to said pad-engaging ends of said chip contacts;

said PC card also includes a frame mounted at a fixed position directly on said circuit board and having a frame recess of the same width as said chip card for receiving the chip card and locating it with respect to said chip contacts;

said aperture in said top sheet metal cover communicates with said recess in said frame to permit the insertion of the chip card through said aperture into said frame recess.

2. The PC card described in claim 1 including:

a sheet metal lid for opening and closing said aperture, said lid being slidably mounted on said frame in a plane substantially parallel to said planar top portion of said top sheet metal cover part, between a closed position wherein said lid covers said aperture to prevent the passage of radio waves therethrough, and an open position to allow said chip card to pass through said aperture.

3. The PC card described in claim 1 wherein:

said top sheet metal cover has a depressed part forming a cover recess for receiving said chip card, and said aperture forms a slot at an end of said cover recess, so said chip card can be laid at least partially in said cover recess and slid outward, with said frame recess lying outward of said cover recess to receive said chip card when said chip card is slid outwardly through said slot.

4. The PC card described in claim 1 wherein:

said chip card has a predetermined length and said frame aperture is longer than said chip card length, so said chip card can slide in opposite outward and inward directions along said recess, with said frame recess having a reception part lying directly under said aperture to receive said chip card and with said top cover having outward and inward hold-down walls extending in said outward and inward directions from said reception part, with said aperture having a shorter length in said outward and inward directions than said chip card, so said chip card can be tilted from the horizontal and slid through said aperture and outward along said recess until all of said chip card lies within said recess and then said chip card can be slid inwardly to a final position wherein opposite ends of said chip card are held down by said outward and inward hold-down walls.

5. The PC card described in claim 1 including:

a sheet metal lid for opening and closing said aperture, said lid being slidably mounted on said frame in a plane substantially parallel to said planar top portion of said top sheet metal cover part, between a closed position wherein said lid covers said aperture to prevent the passage of radio waves therethrough, and an open position to allow said chip card to pass through said aperture.

said chip card has a predetermined length;

said frame has a pair of guides that extend in said outward and inward directions by a distance greater than the chip card length, and said sheet metal lid has a pair of tabs bent to partially encircle said guides so said lid can slide along said guides.

6. The PC card described in claim 1 wherein:

said PC card includes a molded block that is mounted on said circuit board, with said chip contacts fixed in said block.

7. The PC card described in claim 1 wherein:

said aperture opens upwardly;

said frame forms at least one spring arm positioned to press against a location on said chip card that is spaced from said contact pads, with said spring arm constructed to bias said chip card upward and out through said aperture.

8. The PC card described in claim 1 wherein:

said frame is formed primarily of electrically conductive plastic.

9. The PC card described in claim 2 wherein:

said lid lies directly under said cover planar top portion and in direct sliding contact with said cover planar top portion to electrically connect thereto.

10. The PC card described in claim 3 wherein:

said top sheet metal cover has an auxiliary through slot that is elongated in said inward and outward directions and which has a far end furthest from said aperture, with said far end spaced from said aperture by about the length of said chip card, with said frame having a stop that limits outward movement of said chip card inward of said slot far end, so a thin object can be projected through said auxiliary slot far end and moved inwardly to push the chip card inwardly.

11. The PC card described in claim 6 wherein:

said frame has a rocker part that can be manually deflected down to allow said chip card to move outwardly before said chip card is moved inward to said final position, with said rocker part being biased upwardly and having a stop for preventing said chip card from moving outward when said chip card is in its final position unless said rocker part is again manually deflected down.

12. A PC card of predetermined lateral width and vertical height which has a circuit board with traces thereon, a front connector with front connector contacts coupled to said traces, and largely planar top and bottom sheet metal cover portions lying respectively above and below said circuit board, for receiving a chip card of smaller width and height than that of said PC card, where the chip card has a lower face with contact pads, comprising:

a frame having a frame recess for closely receiving said chip card;

a plurality of chip-engaging contacts terminated to said circuit board and having pad-engaging ends aligned with said recess to engage the contact pads of a chip card that lies in said frame recess;

said top sheet metal cover portion has an aperture that leads to said frame recess so the chip card can be inserted through said aperture into said recess;

an electrically conductive lid which is slidable in a plane parallel and adjacent to said planar top sheet metal cover portion between open and closed positions wherein it opens and closes said aperture;

said lid being slidably mounted on said frame.

13. The PC card described in claim 12 wherein:

said frame has a pair of guideways and said lid is formed of sheet metal and has tabs bent at least partially around said guideways and slidable along said guideways.

14. The PC card described in claim 12 wherein:

said frame is mounted directly on said circuit board, said circuit board has a plurality of traces extending directly from the location of said frame to said front connector contacts, and said chip engaging contacts are soldered to said traces.

15. A PC card of predetermined width and thickness that is designed to receive a chip card of smaller predetermined width and thickness and with a predetermined chip card length, where said chip card has a face with a plurality of chip card pads, comprising:

a circuit board having a plurality of traces;

a sheet metal cover having primarily planar top and bottom portions lying respectively above and below said circuit board;

a frame mounted on said circuit board and forming an upwardly-opening frame recess of a width and length substantially equal to that of said chip card to closely position it the chip card horizontally in the frame;

a plurality of chip-engaging contacts having termination ends terminated to said circuit board traces and having pad-engaging ends lying within said recess to engage said chip card pads;

said cover top portion has an aperture of about the same size as said chip card to allow said chip card to pass therethrough into said frame recess;

a lid movable mounted below said cover to close and open said aperture.

16. The PC card described in claim 15 wherein:

said lid is formed of sheet metal and has tabs bent to form runners that are slidably engaged with said frame.

17. The PC card described in claim 15 wherein:

said aperture has edge walls forming guides;

said lid is formed of sheet metal and has opposite sides slidably engaged with said guides of said aperture edge walls.

18. A method for installing a chip card in a PC card of greater width and thickness than said chip card, comprising:

positioning said chip card so it lies primarily parallel to a primarily planar sheet metal portion top cover part of the PC card, and sliding said chip card primarily horizontally through an aperture in said top cover part and closely between opposite edge walls of a frame recess of a frame that lies under said top cover part until pad-engaging ends of contacts that lie within said recess engage said pads.

19. The method described in claim 18 wherein:

said step of positioning said chip card includes laying said chip card in a depression formed in said top cover part wherein said aperture is in the form of a horizontally-opening slot at an end of said depression and sliding said chip card outwardly through said slot until said chip card lies in a final position in said frame recess.

20. The method described in claim 18 wherein:

said aperture opens upwardly but is not as long, in said outward direction and an opposite inward direction, as said chip card, with said aperture having opposite aperture end walls spaced by less than the length of said chip card, and said step of sliding said chip card includes sliding it outwardly and then inwardly until opposite ends of said chip card lie under said opposite ends of said aperture end walls.

* * * * *